US012074384B1

(12) United States Patent
Zheng et al.

(10) Patent No.: US 12,074,384 B1
(45) Date of Patent: Aug. 27, 2024

(54) ADJUSTABLE HOLOGRAPHIC METAMATERIAL ANTENNA STRUCTURE

(71) Applicant: Chengdu Guoheng Space Technology Engineering Co., Ltd., Chengdu (CN)

(72) Inventors: Tianrui Zheng, Chengdu (CN); Zhongchao Luo, Chengdu (CN); He Cai, Chengdu (CN); Ran Mo, Chengdu (CN); Fawen Rong, Chengdu (CN); Xu Zhao, Chengdu (CN)

(73) Assignee: Chengdu Guoheng Space Technology Engineering Co., Ltd., Chengdu (CN)

( * ) Notice: Subject to any disclaimer, the term of this patent is extended or adjusted under 35 U.S.C. 154(b) by 0 days.

(21) Appl. No.: 18/583,050

(22) Filed: Feb. 21, 2024

(30) Foreign Application Priority Data

Oct. 8, 2023 (CN) ......................... 202311290010.9

(51) Int. Cl.
*H01Q 3/46* (2006.01)
*H01Q 1/50* (2006.01)
*H01Q 15/00* (2006.01)

(52) U.S. Cl.
CPC ................. *H01Q 3/46* (2013.01); *H01Q 1/50* (2013.01); *H01Q 15/0086* (2013.01)

(58) Field of Classification Search
CPC ...... H01Q 3/46; H01Q 15/00; H01Q 15/0086; H01Q 1/50
See application file for complete search history.

(56) References Cited

U.S. PATENT DOCUMENTS 11,502,396 B2 * 11/2022 Yoo ........................ H01Q 21/28
2015/0222021 A1 * 8/2015 Stevenson ............ H01Q 21/005 343/771

FOREIGN PATENT DOCUMENTS

CN 113595607 B * 6/2022 ........... H04B 7/0456

* cited by examiner

*Primary Examiner* — Hoang V Nguyen
(74) *Attorney, Agent, or Firm* — Jeenam Park

(57) ABSTRACT

The present invention discloses an adjustable holographic metamaterial antenna structure, wherein the structure comprises: a surface waveguide feed network configured to connect to a power dividing network; a varactor diode bias circuit configured to comprise a direct current bias circuit and a plurality of varactor diodes associated with the direct current bias circuit; and a metamaterial surface arranged above the direct current bias circuit, and the metamaterial surface and the direct current bias circuit are connected through a bias via hole; wherein the metamaterial surface and the direct current bias circuit separately perform direct current bias feeding on each of the varactor diodes, and an interference pattern of the metamaterial surface is changed to achieve scanning of a radiation pattern. The present invention solves the problems that a two-dimensional feed network layout of a holographic-metamaterial antenna is difficult and is easy to interfere with radio frequency signals.

5 Claims, 4 Drawing Sheets

ADJUSTABLE HOLOGRAPHIC METAMATERIAL ANTENNA STRUCTURE

CROSS-REFERENCE TO RELATED APPLICATIONS

This application claims priority to Chinese Patent Application No. 202311290010.9, filed on Oct. 8, 2023, which is hereby incorporated by reference in its entirety.

TECHNICAL FIELD

The present invention relates to the field of communication, and in particular, to an adjustable holographic metamaterial antenna structure.

BACKGROUND

Compared with the conventional reflector and lens technology, a holographic-metamaterial antenna has the advantages of low profile, low complexity, light weight, easiness in modulation and the like, and has a very bright prospect in developing a compact and adjustable antenna system. Therefore, the holographic-metamaterial antenna is highly advantageous in a satellite communication application requiring high gain, high efficiency, and electrical adjustability.

The holographic antenna is based on holographic theory and operates on a principle of converting a reference wave 1 (a guided feed electromagnetic wave) into a primary radiation beam 5, as shown in FIG. 1. A key component of the holographic antenna is a metamaterial surface structure 3 on a substrate 2, which is configured to record interference patterns of the reference wave 1 and an object wave 4. The metamaterial is an artificial composite material specifically designed to exhibit properties not readily found in nature. The metamaterial provides the unique ability to control electromagnetic waves by controlling phase using low-profile and low-cost hardware on a surface consisting of a periodic array of sub-wavelength units. Meanwhile, the metamaterial can be reconfigured by embedding an adjustable voltage control unit, such as a diode, in each sub-wavelength lattice unit. Therefore, an adjustable surface impedance of a metamaterial surface (a metasurface) provides a good choice for designing reconfigurable holographic satellite communication antennas. The adjustable holographic-metamaterial antenna consists of three main parts, as shown in FIG. 2, including a feed network, a varactor diode bias circuit, and a metamaterial surface. The feed network is configured to feed each metamaterial unit, and a varactor diode controls a direction of the radiation beam by changing a bias voltage and changing the phase distribution on the metamaterial surface.

The currently realized holographic-metamaterial antennas generally use coplanar waveguides and microstrip arrays for feeding, which have defects such as low aperture efficiency, serious dielectric loss, and narrow bandwidth. Therefore, how to solve the problem in the conventional technology that a two-dimensional feed network layout of a holographic-metamaterial antenna is difficult and is easy to interfere with radio frequency signals is a technical problem that urgently needs to be solved.

SUMMARY

A primary objective of the present invention is to provide an adjustable holographic metamaterial antenna structure, which aims to solve the problem in the conventional technology that a two-dimensional feed network layout of a holographic-metamaterial antenna is difficult and is easy to interfere with radio frequency signals.

In order to achieve the objective, the present invention provides an adjustable holographic metamaterial antenna structure, comprising:

- a surface waveguide feed network, wherein the surface waveguide feed network is configured to connect to a power dividing network;
- a varactor diode bias circuit, wherein the varactor diode bias circuit is configured to comprise a direct current bias circuit and a plurality of varactor diodes associated with the direct current bias circuit; and
- a metamaterial surface, wherein the metamaterial surface is arranged above the direct current bias circuit, and the metamaterial surface and the direct current bias circuit are connected through a bias via hole;
- wherein the metamaterial surface and the direct current bias circuit separately perform direct current bias feeding on each of the varactor diodes, and an interference pattern of the metamaterial surface is changed to achieve scanning of a radiation pattern.

Optionally, the surface waveguide feed network is configured to match a size of the metamaterial surface.

Optionally, the metamaterial surface is configured to use a wire grid as a bias line for a lattice unit on the metamaterial surface.

Optionally, the plurality of varactor diodes are separately arranged in the lattice unit on the metamaterial surface.

Optionally, the metamaterial surface and the direct current bias circuit separately perform direct current bias feeding on a varactor diode of each lattice unit on the metamaterial surface.

Optionally, the wire grid is configured to be formed using a set of parallel metal wires, constituting a wire grid bias circuit.

Optionally, the metamaterial surface and the wire grid bias circuit are configured to be integrated on the same PCB board.

Optionally, the adjustable holographic metamaterial antenna structure further comprises: an adjustable unit; wherein the adjustable unit is configured to be adjustable by connecting the wire grid bias circuit.

The present invention has the beneficial effects that: provided is an adjustable holographic metamaterial antenna structure, wherein the structure comprises: a surface waveguide feed network, wherein the surface waveguide feed network is configured to connect to a power dividing network; a varactor diode bias circuit, wherein the varactor diode bias circuit is configured to comprise a direct current bias circuit and a plurality of varactor diodes associated with the direct current bias circuit; and a metamaterial surface, wherein the metamaterial surface is arranged above the direct current bias circuit, and the metamaterial surface and the direct current bias circuit are connected through a bias via hole; wherein the metamaterial surface and the direct current bias circuit separately perform direct current bias feeding on each of the varactor diodes, and an interference pattern of the metamaterial surface is changed to achieve scanning of a radiation pattern. The present invention solves the problems that a two-dimensional feed network layout of a holographic-metamaterial antenna is difficult and is easy to interfere with radio frequency signals by creatively applying wire grids as bias lines of a lattice unit in a metasurface.

Figure 1:
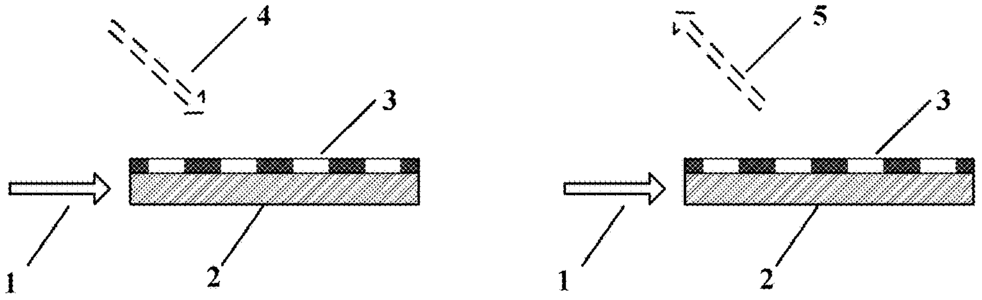
FIG. 1 is a schematic diagram of a principle of a holographic antenna based on holographic theory.
Figure 2:
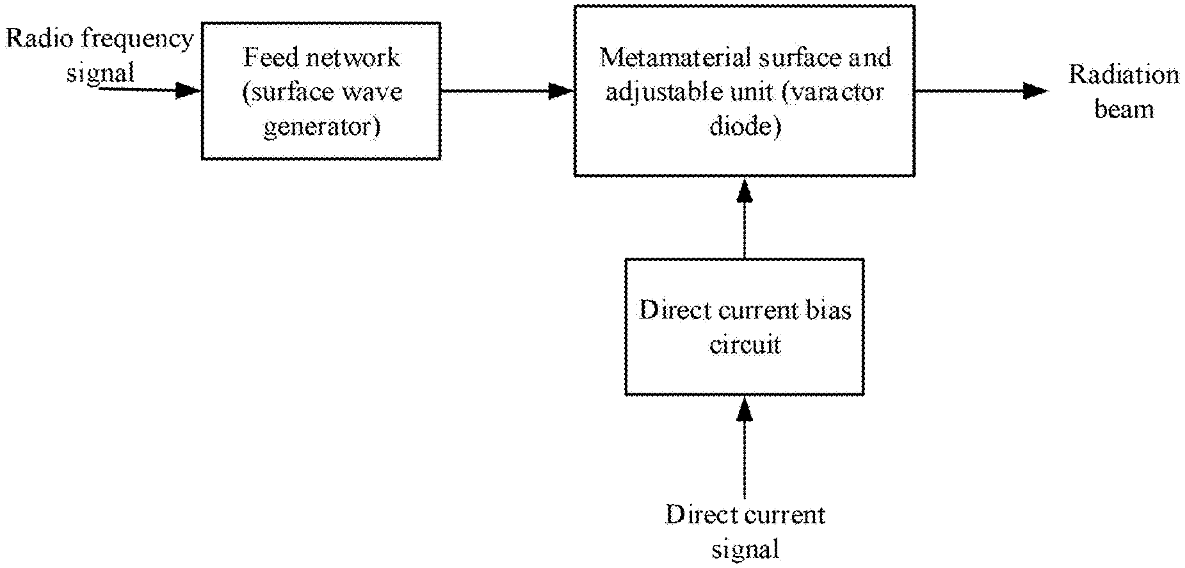
FIG. 2 is a schematic diagram of a principle of an adjustable holographic-metamaterial antenna.

The realization of the objectives, the functional features, and the advantages of the present invention will be further explained in conjunction with the embodiments and with reference to the drawings.

DESCRIPTIONS OF REFERENCE NUMERALS

1: reference wave; 2: substrate; 3: metamaterial surface structure; 4: object wave; 5: primary radiation beam; 6: power dividing network; 7: surface waveguide feed network; 8: bias via hole; 9: direct current bias circuit; 10: metamaterial surface; 11: varactor diode; 12: parallel metal wire; 13: coaxial feed port; 14: metamaterial surface containing bias circuit; 15: adjustable unit; 16: K-type microstrip structure; 17: PIN diode; 18: bias post; 19: tuned metasurface array; 20: varactor diode bias circuit; 21: wire grid; 22: wire grid bias circuit; 23: PCB board; and 24: lattice unit.

DESCRIPTION OF EMBODIMENTS

In order to make the objectives, technical solutions and advantages of the present invention more apparent, the present invention is further described in detail below with reference to the accompanying drawings and embodiments. It should be understood that the specific embodiments described herein are merely illustrative of the present invention and do not limit the present invention.

Figure 6:
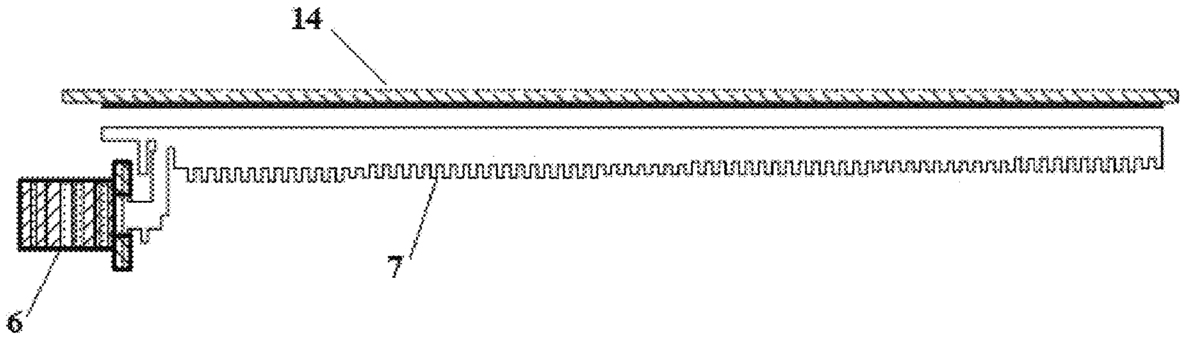
FIG. 6 is a schematic diagram of an adjustable holographic metamaterial antenna structure according to the present invention.

An embodiment of the present invention provides an adjustable holographic metamaterial antenna structure, and referring to FIG. 6, FIG. 6 is a schematic diagram of an embodiment of an adjustable holographic metamaterial antenna structure according to the present invention.

In this embodiment, an adjustable holographic metamaterial antenna structure comprises:

a surface waveguide feed network 7, wherein the surface waveguide feed network 7 is configured to connect to a power dividing network 6;

a varactor diode bias circuit 20, wherein the varactor diode bias circuit 20 is configured to comprise a direct current bias circuit 9 and a plurality of varactor diodes 11 associated with the direct current bias circuit 9; and a metamaterial surface 10, wherein the metamaterial surface 10 is arranged above the direct current bias circuit 9, and the metamaterial surface 10 and the direct current bias circuit 9 are connected through a bias via hole 8;

wherein the metamaterial surface 10 and the direct current bias circuit 9 separately perform direct current bias feeding on each of the varactor diodes 11, and an interference pattern of the metamaterial surface 10 is changed to achieve scanning of a radiation pattern.

In a preferred embodiment, the surface waveguide feed network 7 is configured to match a size of the metamaterial surface 10.

In a preferred embodiment, the metamaterial surface 10 is configured to use a wire grid 21 as a bias line for a lattice unit 24 on the metamaterial surface 10. The plurality of varactor diodes 11 are separately arranged in the lattice unit 24 on the metamaterial surface 10. The metamaterial surface 10 and the direct current bias circuit 9 separately perform direct current bias feeding on a varactor diode 11 of each lattice unit 24 on the metamaterial surface 10.

Based on this, the wire grid 21 is configured to be formed using a set of parallel metal wires 12, constituting a wire grid bias circuit 22. The metamaterial surface 10 and the wire grid bias circuit 22 are configured to be integrated on the same PCB board 23.

In a preferred embodiment, the adjustable holographic metamaterial antenna structure further comprises: an adjustable unit 15; wherein the adjustable unit 15 is configured to be adjustable by connecting the wire grid bias circuit 22.

In this embodiment, provided is an adjustable holographic metamaterial antenna structure, which solves the problems that a two-dimensional feed network layout of a holographic-metamaterial antenna is difficult and is easy to interfere with radio frequency signals by creatively applying wire grids 21 as bias wires of a lattice unit 24 in a metasurface.

In order to explain the present application more clearly, a specific example of the adjustable holographic metamaterial antenna structure according to the present application is provided below.

Figure 3:
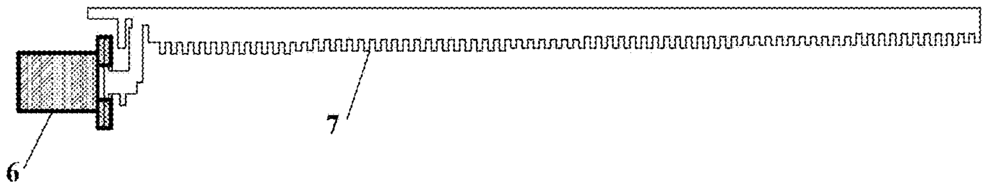
FIG. 3 is a schematic diagram of a structure of a novel surface waveguide feed network according to the present invention including a power dividing network and a surface waveguide feed network.

In this embodiment, a novel surface waveguide feed network is used, as shown in FIG. 3, and comprises a power dividing network 6 and a surface waveguide feed network 7. Such a grooved surface waveguide is designed to match a size of the metamaterial surface 10 to improve efficiency. The holographic antenna is designed assuming that the reference wave 1 is a plane wave, the electromagnetic wave transmitted in the grooved surface waveguide is approximately a plane wave. The feed network in the present invention does not use a lossy dielectric material, and the loss is far less than that of a patch array; compared with a rectangular waveguide feed network, this feed network has a higher efficiency and utilizes the metamaterial surface 10 to the maximum extent.

Figure 4:
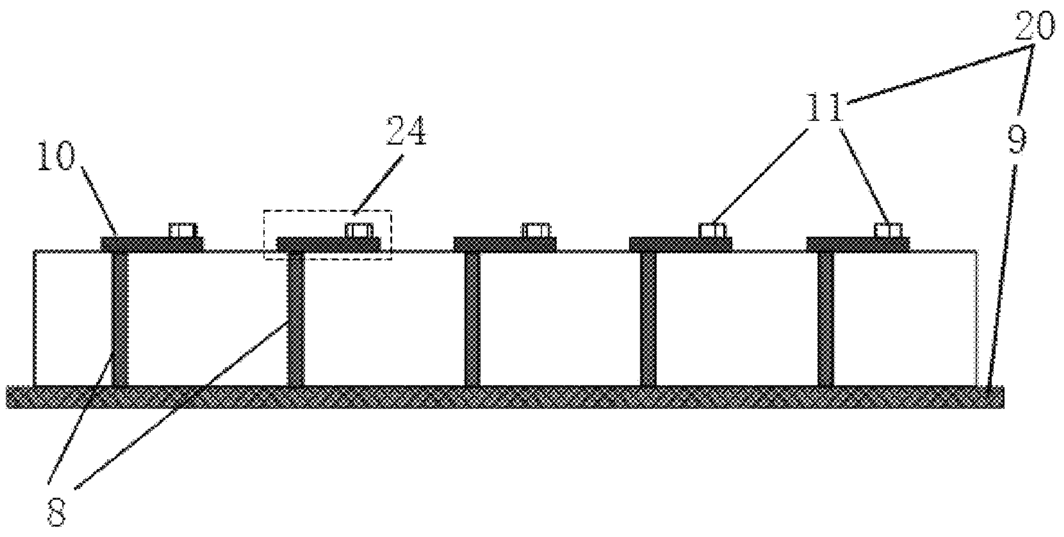
FIG. 4 is a schematic diagram of the connection between a metamaterial surface and a direct current bias circuit according to the present invention.
Figure 5:
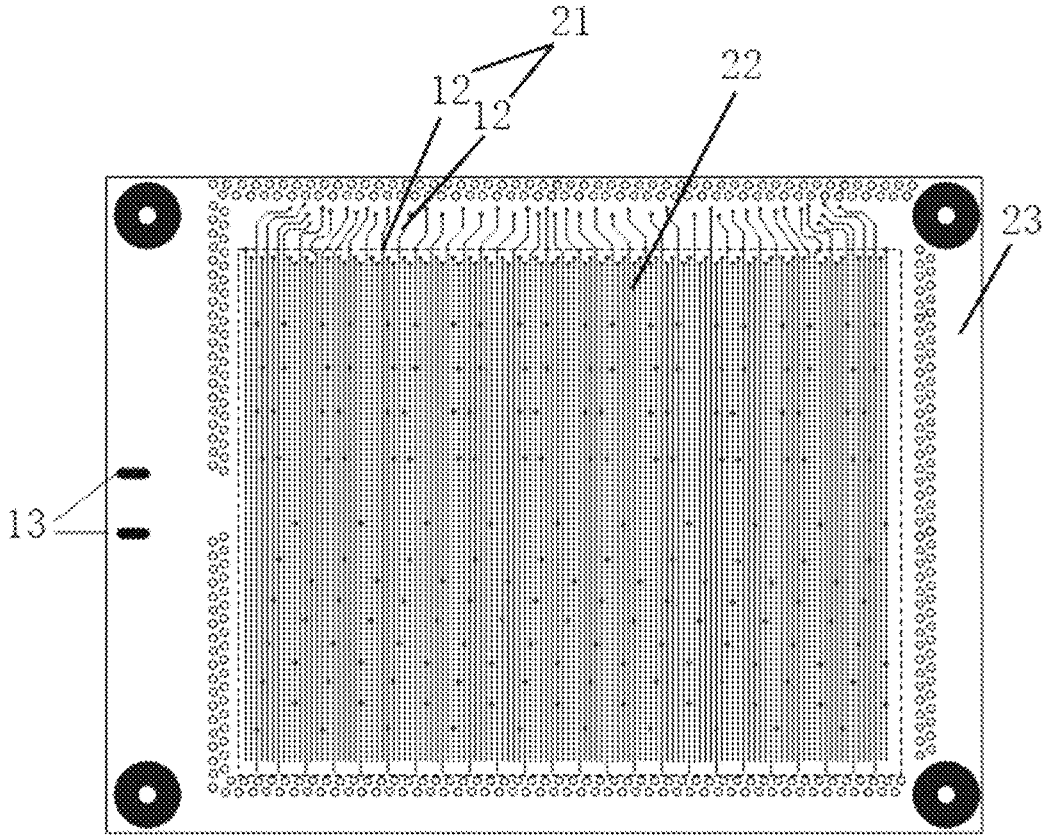
FIG. 5 is a schematic diagram of a wire grid bias circuit of an adjustable holographic-metamaterial antenna system according to the present invention.

In the reconfigurable holographic-metamaterial antennas, the metamaterial lattice units 24 all require a direct current bias voltage, and the design of a direct current bias circuit is a challenge, which requires all bias wires to be arranged below the metamaterial surface 10 or through the metamaterial surface 10 without hindering the propagation of radio frequency signals at the metamaterial surface 10. This embodiment creatively applies the wire grid 21 as the bias line of the lattice unit 24 on the 2D metamaterial surface 10, as shown in FIG. 4, the metamaterial surface 10 is placed above a direct current bias circuit 9 based on the wire grid 21, the metamaterial surface 10 and the direct current bias circuit 9 based on the wire grid 21 are connected through a bias via hole 8, direct current bias feeding is performed on the varactor diode 11 on each metamaterial lattice, and an interference pattern of the metamaterial surface 10 is changed to achieve scanning of a radiation pattern. FIG. 5 is a schematic diagram of a wire grid bias circuit 22 of an adjustable holographic-metamaterial antenna system, where points are via holes, and a set of parallel metal wires 12 form a wire grid 21, which can implement direct current bias feeding on the metamaterial surface 10 without hindering the transmission of the radio frequency signals, and 13 is a coaxial feed port.

In practical applications, the wire grid 21 can be processed on a common PCB board 23 to reduce cost and manufacturing difficulty, and can be processed on one PCB board 23 with the metamaterial surface 10 by adopting a multi-layer board process, so that the wire grid can be implemented on a standard PCB with a lower cost and a smaller size.

Figure 7:
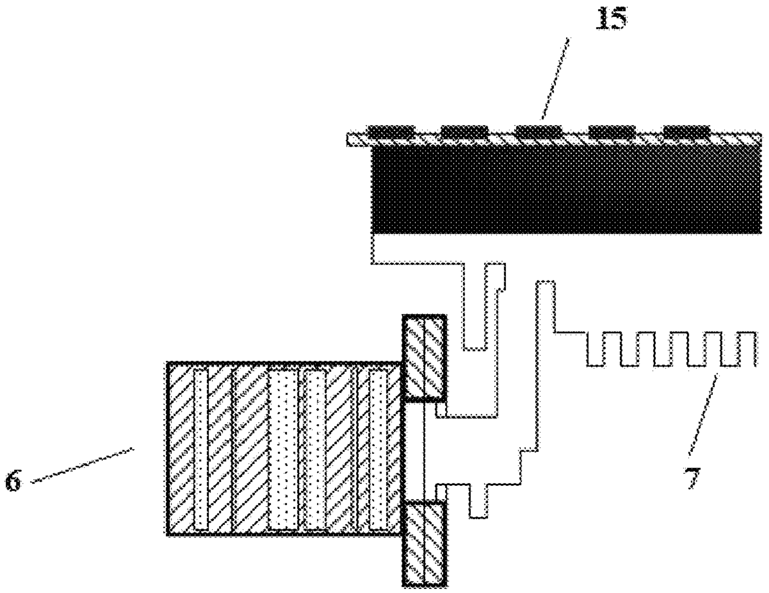
FIG. 7 is a schematic diagram of a structure of a metamaterial surface and a wire grid bias circuit according to the present invention on the same PCB.
Figure 8:
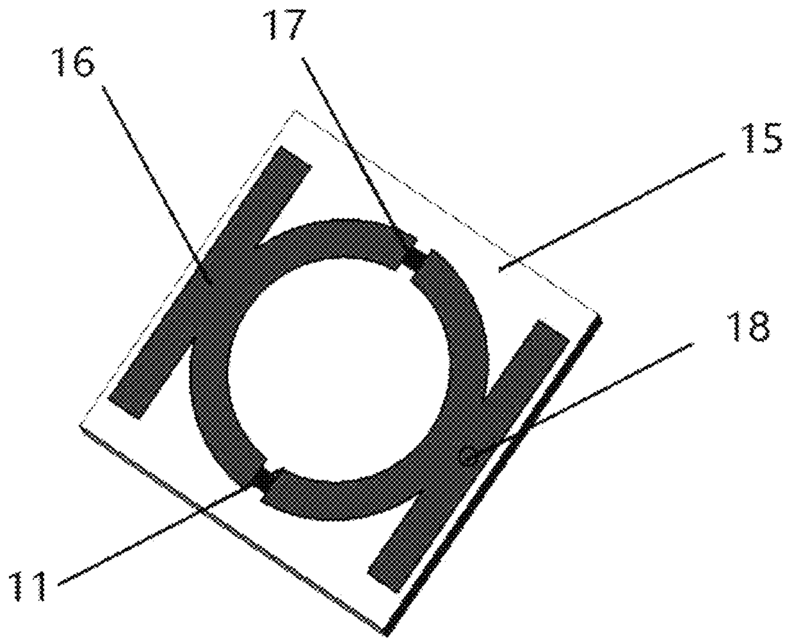
FIG. 8 is a schematic diagram of a structure of an adjustable unit according to the present invention.
Figure 9:
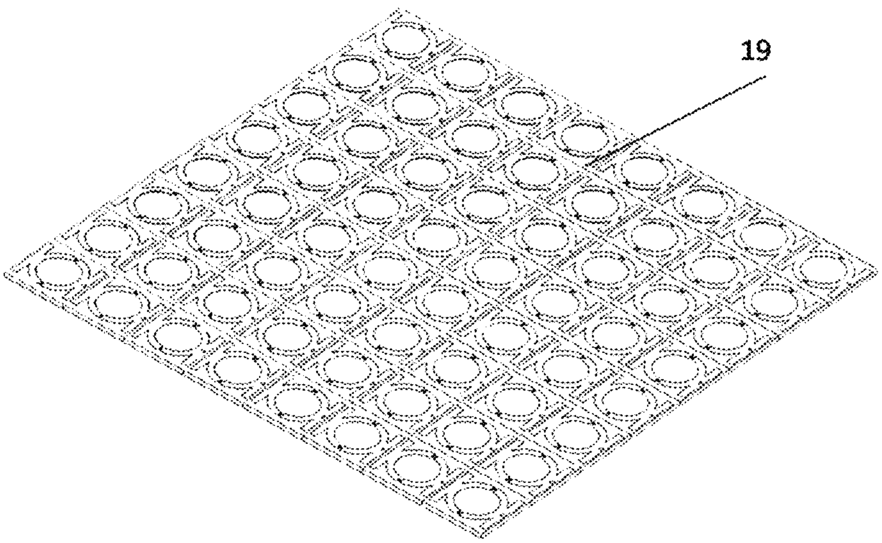
FIG. 9 is a schematic diagram of a structure of a tuned metasurface array according to the present invention.

This embodiment proposes a novel integrated low-profile, high-efficiency, broadband adjustable holographic-metamaterial antenna system by integrating the wire grid bias circuit 22 and the novel surface waveguide feed network. As shown in FIG. 7, the metamaterial surface 10 and the wire grid bias circuit 22 can be integrated and manufactured on the same PCB board 23 to synthesize a metamaterial surface 14 containing a bias circuit, and the adjustable unit 15 can be adjustable by the wire grid bias circuit 22; as shown in FIG. 8, the adjustable unit is composed of a K-type microstrip structure 16, a PIN diode 17, a varactor diode 11, and a bias line, the bias line is connected to the K-type microstrip structure 16 through a bias post 18, and phase adjustment is achieved by adjusting an input voltage to control capacitance of the varactor diode 11 and a conduction state of the PIN diode 17; and as shown in FIG. 9, the metamaterial surface 14 containing the bias circuit is formed by a plurality of adjustable units 15 into a tuned metamaterial array 19. The metamaterial surface 14 containing a bias circuit is placed over the surface waveguide feed network 7.

Specifically, this embodiment adopts a novel surface waveguide feed network, which greatly simplifies the complexity of the feed network and the antenna structure, and has a very low loss, a high aperture efficiency and broadband characteristics. The present invention solves the problems that a two-dimensional feed network layout of a holographic-metamaterial antenna is difficult and is easy to interfere with radio frequency signals by creatively applying wire grids 21 as bias lines of a lattice unit 24 in a metasurface.

The key protection point of this technical solution is an adjustable holographic-metamaterial antenna using a novel surface waveguide feed network and a direct current bias circuit based on the wire grid 21. Compared with the solution that the existing holographic-metamaterial antenna generally adopts coplanar waveguide and microstrip array for feeding, this technical solution of present invention has low insertion loss, low power consumption and a simple manufacture process; and is ultra-light and thin, fast and adjustable, and simple and reliable in modulation. This technical solution has the technical advantages of high efficiency brought by the uniform planar feed wave provided by the novel surface waveguide feed structure, simplicity of direct current bias circuit design brought by the direct current bias circuit based on the wire grid 21, and the like.

It should be understood that, in the description of this specification, the description with reference to the terms “one embodiment”, “another embodiment”, “other embodiments”, “first embodiment to Nth embodiment” or the like means the particular features, structures, materials or characteristics described in combination with the embodiment or example are included in at least one embodiment or example of the present invention. In this specification, the schematic expression of the above terms does not necessarily refer to the same embodiments or examples. Furthermore, the specific features, structures, materials, or characteristics described can be combined in any suitable manner in any one or more embodiments or examples.

It should be noted that terms “include”, “comprise”, or any other variants thereof used herein are intended to cover a non-exclusive inclusion, so that a process, a method, an article or a system that includes a list of elements includes those elements, and also includes other elements which are not expressly listed, or further includes elements inherent to this process, method, article or system. Without further limitation, an element defined by the phrase “including a/an . . . ” does not exclude the presence of another identical elements in the process, method, article or system that includes the element.

The above serial numbers of the embodiments of the present invention are only for description and do not represent the advantages and disadvantages of the embodiments.

The above mentioned contents are merely preferred embodiments of the present invention and are not intended to limit the patent scope of the present invention. The equivalent structure or equivalent process transformation made by using the contents of the specification and the drawings of the present invention, or direct or indirect applications to other related technical fields, are all included in the patent protection scope of the present invention.

What is claimed is:

1. An adjustable holographic metamaterial antenna structure, comprising:

a surface waveguide feed network, wherein the surface waveguide feed network is configured to connect to a power dividing network;

a varactor diode bias circuit, wherein the varactor diode bias circuit is configured to comprise a direct current bias circuit and a plurality of varactor diodes associated with the direct current bias circuit; and a metamaterial surface, wherein the metamaterial surface is arranged above the direct current bias circuit, and the metamaterial surface and the direct current bias circuit are connected through a bias via hole;

wherein the metamaterial surface and the direct current bias circuit separately perform direct current bias feeding on each of the varactor diodes, and an interference pattern of the metamaterial surface is changed to achieve scanning of a radiation pattern; the metamaterial surface is configured to use a wire grid as a bias line for a lattice unit on the metamaterial surface; the plurality of varactor diodes are separately arranged in the lattice unit on the metamaterial surface; the metamaterial surface and the direct current bias circuit separately perform direct current bias feeding on a varactor diode of each lattice unit on the metamaterial surface; and the metamaterial surface is placed above a direct current bias circuit based on the wire grid, the metamaterial surface and the direct current bias circuit based on the wire grid are connected through a bias via hole, and direct current bias feeding is performed on the varactor diode on each metamaterial lattice.

2. The adjustable holographic metamaterial antenna structure according to claim 1, wherein the surface waveguide feed network is configured to match a size of the metamaterial surface.

3. The adjustable holographic metamaterial antenna structure according to claim 1, wherein the wire grid is configured to be formed using a set of parallel metal wires, constituting a wire grid bias circuit.

4. The adjustable holographic metamaterial antenna structure according to claim 3, wherein the metamaterial surface and the wire grid bias circuit are configured to be integrated on the same PCB board.

5. The adjustable holographic metamaterial antenna structure according to claim 4, further comprising: an adjustable unit; wherein the adjustable unit is configured to be adjustable by connecting the wire grid bias circuit.

* * * * *